US012681931B2

(12) United States Patent
Karlberg et al.

(10) Patent No.: US 12,681,931 B2
(45) Date of Patent: Jul. 14, 2026

(54) COMBINING REASONING AND EXPLICIT GRAPH WALKS IN MULTI-DOMAIN QUERIES

(71) Applicant: Microsoft Technology Licensing, LLC, Redmond, WA (US)

(72) Inventors: Jan-Ove Almli Karlberg, Tromsø (NO); Anders Tungeland Gjerdrum, Tromsø (NO); Theodoros Gkountouvas, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/988,658

(22) Filed: Dec. 19, 2024

(65) Prior Publication Data

US 2026/0178581 A1 Jun. 25, 2026

(51) Int. Cl.
| | |
|---|---|
| *G06F 16/00* | (2019.01) |
| *G06F 16/21* | (2019.01) |
| *G06F 16/2453* | (2019.01) |
| *G06F 16/901* | (2019.01) |

(52) U.S. Cl.
CPC ...... *G06F 16/24542* (2019.01); *G06F 16/212* (2019.01); *G06F 16/9024* (2019.01)

(58) Field of Classification Search
CPC ............. G06F 16/24542; G06F 16/212; G06F 16/9024
See application file for complete search history.

(56) References Cited

U.S. PATENT DOCUMENTS

| | | | | |
|---|---|---|---|---|
| 10,545,982 | B1 * | 1/2020 | Kramer | G06F 16/256 |
| 12,282,504 | B1 * | 4/2025 | Ganesh | G06F 16/383 |
| 12,386,799 | B1 * | 8/2025 | Akula | G06F 16/215 |
| 12,393,581 | B2 * | 8/2025 | Petersen | G06F 16/24522 |
| 12,423,311 | B1 * | 9/2025 | Stoll | G06F 16/24578 |
| 2016/0283551 | A1 * | 9/2016 | Fokoue-Nkoutche | G06F 16/182 |

(Continued)

FOREIGN PATENT DOCUMENTS

| | | |
|---|---|---|
| CN | 118070906 A | 5/2024 |

OTHER PUBLICATIONS

"Keyword Query Language (KQL) syntax reference", Retrieved from the Internet: <<https://learn.microsoft.com/en-us/sharepoint/dev/general-development/keyword-query-language-kql-syntax-reference>>, Apr. 16, 2023, 18 Pages.

(Continued)

*Primary Examiner* — Alexander Khong
(74) *Attorney, Agent, or Firm* — Novo TechIP International PLLC

(57) ABSTRACT

A data processing system implements systems and methods for performing multi-domain queries that combine explicit graph walks and fuzzy semantic reasoning of language models. These systems and methods leverage the fuzzy semantic reasoning capabilities of a language model during query execution to generate query results that are based on inferences that are not expressly defined in the graph. These techniques utilize grounding and prompt construction techniques to ensure that the language model generates an output that is consistent with a global schema that represents the types of data available from the graph data sources to significantly reduce the risk that the language model will hallucinate and generate erroneous results.

20 Claims, 11 Drawing Sheets

(56) References Cited

U.S. PATENT DOCUMENTS

| | | | |
|---|---|---|---|
| 2022/0292092 A1* | 9/2022 | Brown | G06F 16/2458 |
| 2023/0161969 A1* | 5/2023 | Olsen | G06F 40/169 |
| | | | 704/9 |
| 2023/0169075 A1* | 6/2023 | Han | G06F 16/243 |
| | | | 707/769 |
| 2024/0193170 A1* | 6/2024 | Ducaule | G06F 16/24553 |
| 2025/0147957 A1* | 5/2025 | Verkruyse | G06F 16/24522 |
| 2025/0225108 A1* | 7/2025 | Sharma | G06F 16/211 |
| 2025/0279929 A1* | 9/2025 | Savalle | H04L 41/0686 |

OTHER PUBLICATIONS

Fang, et al., "DARA: Decomposition-Alignment-Reasoning Autonomous Language Agent for Question Answering over Knowledge Graphs", arXiv:2406.07080v1, Jun. 11, 2024, 27 pages.
International Search Report and Written Opinion received for PCT Application No. PCT/US2025/044363, mailed on Dec. 2, 2025, 15 pages.
Zhou, et al., "R^3-NL2GQL: A Hybrid Models Approach for for Accuracy Enhancing and Hallucinations Mitigation", arXiv:2311.01862v1, Nov. 3, 2023, 12 pages.

* cited by examiner

FIG. 3A

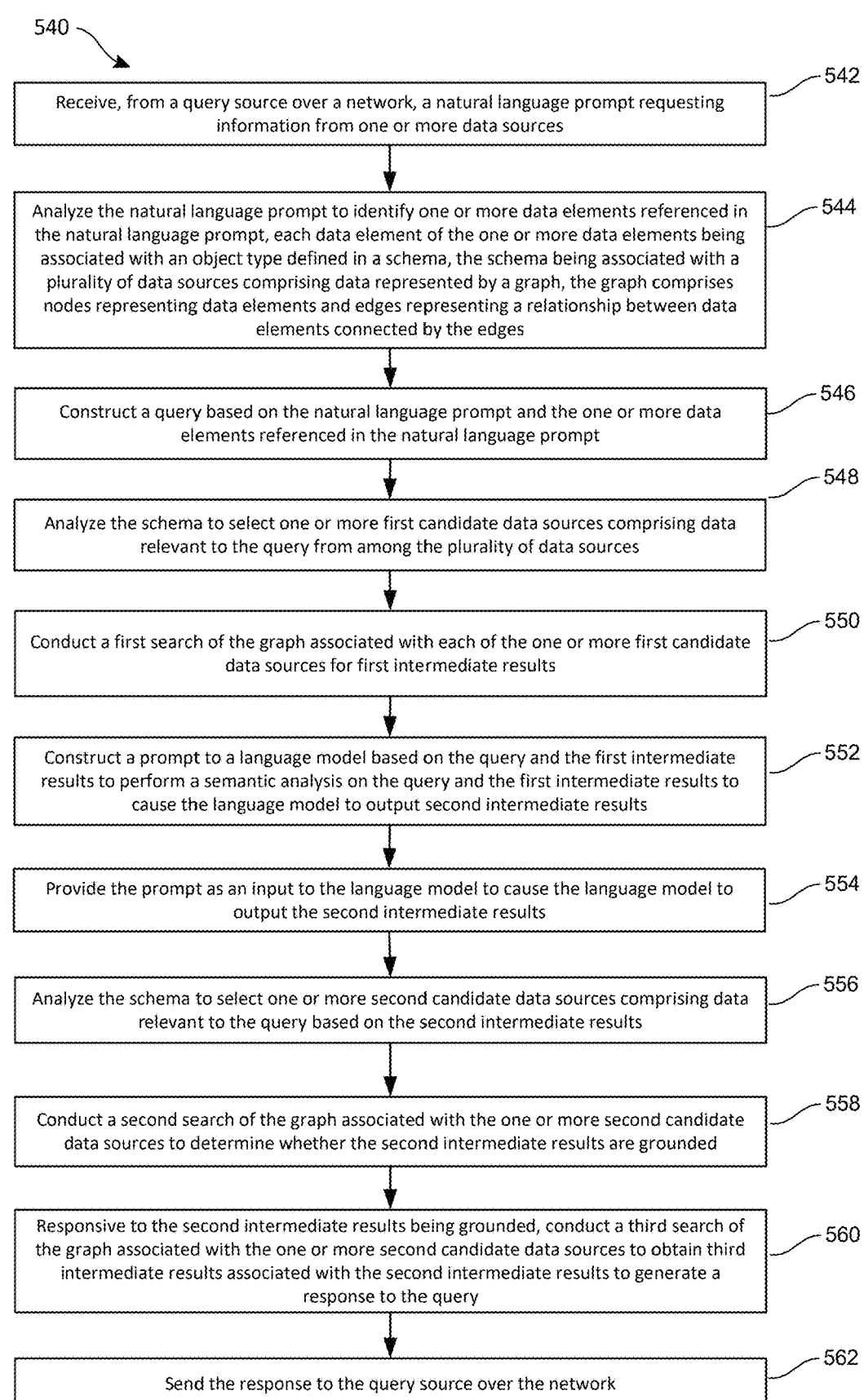

540

542
Receive, from a query source over a network, a natural language prompt requesting information from one or more data sources 544
Analyze the natural language prompt to identify one or more data elements referenced in the natural language prompt, each data element of the one or more data elements being associated with an object type defined in a schema, the schema being associated with a plurality of data sources comprising data represented by a graph, the graph comprises nodes representing data elements and edges representing a relationship between data elements connected by the edges 546
Construct a query based on the natural language prompt and the one or more data elements referenced in the natural language prompt 548
Analyze the schema to select one or more first candidate data sources comprising data relevant to the query from among the plurality of data sources 550
Conduct a first search of the graph associated with each of the one or more first candidate data sources for first intermediate results 552
Construct a prompt to a language model based on the query and the first intermediate results to perform a semantic analysis on the query and the first intermediate results to cause the language model to output second intermediate results 554
Provide the prompt as an input to the language model to cause the language model to output the second intermediate results 556
Analyze the schema to select one or more second candidate data sources comprising data relevant to the query based on the second intermediate results 558
Conduct a second search of the graph associated with the one or more second candidate data sources to determine whether the second intermediate results are grounded 560
Responsive to the second intermediate results being grounded, conduct a third search of the graph associated with the one or more second candidate data sources to obtain third intermediate results associated with the second intermediate results to generate a response to the query 562
Send the response to the query source over the network

FIG. 5B

```
MATCH (input)-[e: AS_CONCEPT]->(c:Concept)
WHERE e.prompt = 'User provided prompt'
AND e.inputColumns = ['InputColumn1','InputColumn2'] AND c.OutputColumns =
['FileName']
MATCH (c)-[AS_FACT]->(f:File)
RETURN f
```

FIG. 8

COMBINING REASONING AND EXPLICIT GRAPH WALKS IN MULTI-DOMAIN QUERIES

BACKGROUND

Graphs provide a useful tool for representing data from data sources. The nodes of the graphs represent entities, while the edges between nodes represent relationships between these entities. Exposing data in a data source as a graph data structure provides a means for conveniently accessing and querying the data in the data source. The graph facilitates fact-based traversals of the graph, which provides a powerful tool for analyzing data. However, the ability to construct queries that facilitate reasoning over the data in the graph using current graph query tools is quite limited.

Language models provide a powerful means for drawing out the semantic meaning from data but there are currently no effective tool for combining the fact-based traversals of the graph with the fuzzy semantic reasoning power of the language models. Hence, there is a need for improved systems and methods that combine the fact-based traversals of graph data structures with the reasoning abilities of language models.

SUMMARY

An example data processing system according to the disclosure includes a processor and a memory storing executable instructions. The instructions when executed cause the processor alone or in combination with other processors to perform operations including receiving, from a query source over a network, a query requesting information comprising one or more data elements, each data element of the one or more data elements being associated with an object type defined in a schema, the schema being associated with a plurality of data sources comprising data represented by a graph, the graph comprises nodes representing data elements and edges representing a relationship between data elements connected by the edges; analyzing the schema to select one or more first candidate data sources comprising data relevant to the query from among the plurality of data sources; conducting a first search of the graph associated with each of the one or more first candidate data sources for first intermediate results; constructing a prompt to a language model based on the query and the first intermediate results to utilize fuzzy reasoning capabilities of the language model to perform a semantic analysis on the query and the first intermediate results to cause the language model to output second intermediate results; providing the prompt as an input to the language model to cause the language model to output the second intermediate results; analyzing the schema to select one or more second candidate data sources comprising data relevant to the query based on the second intermediate results; conducting a second search of the graph associated with the one or more second candidate data sources to determine whether the second intermediate results are grounded; responsive to the second intermediate results being grounded, conducting a third search of the graph associated with the one or more second candidate data sources to obtain third intermediate results associated with the second intermediate results to generate a response to the query; and sending the response to the query source over the network.

An example method implemented in a data processing system includes receiving, from a query source over a network, a query requesting information comprising one or more data elements, each data element of the one or more data elements being associated with an object type defined in a schema, the schema being associated with a plurality of data sources comprising data represented by a graph, the graph comprises nodes representing data elements and edges representing a relationship between data elements connected by the edges; analyzing the schema to select one or more first candidate data sources comprising data relevant to the query from among the plurality of data sources; conducting a first search of the graph associated with each of the one or more first candidate data sources for first intermediate results; constructing a prompt to a language model based on the query and the first intermediate results to perform a semantic analysis on the query and the first intermediate results to cause the language model to output second intermediate results; providing the prompt as an input to the language model to cause the language model to output the second intermediate results; analyzing the schema to select one or more second candidate data sources comprising data relevant to the query based on the second intermediate results; conducting a second search of the graph associated with the one or more second candidate data sources to determine whether the second intermediate results are grounded; responsive to the second intermediate results being grounded, conducting a third search of the graph associated with the one or more second candidate data sources to obtain third intermediate results associated with the second intermediate results to generate a response to the query; and sending the response to the query source over the network.

An example data processing system according to the disclosure includes a processor and a memory storing executable instructions. The instructions when executed cause the processor alone or in combination with other processors to perform operations including receiving, from a query source over a network, a natural language prompt requesting information from one or more data sources; analyzing the natural language prompt to identify one or more data elements referenced in the natural language prompt, each data element of the one or more data elements being associated with an object type defined in a schema, the schema being associated with a plurality of data sources comprising data represented by a graph, the graph comprises nodes representing data elements and edges representing a relationship between data elements connected by the edges; constructing a query based on the natural language prompt and the one or more data elements referenced in the natural language prompt; analyzing the schema to select one or more first candidate data sources comprising data relevant to the query from among the plurality of data sources; conducting a first search of the graph associated with each of the one or more first candidate data sources for first intermediate results; constructing a prompt to a language model based on the query and the first intermediate results to utilize fuzzy reasoning capabilities of the language model to perform a semantic analysis on the query and the first intermediate results to cause the language model to output second intermediate results; providing the prompt as an input to the language model to cause the language model to output the second intermediate results; analyzing the schema to select one or more second candidate data sources comprising data relevant to the query based on the second intermediate results; conducting a second search of the graph associated with the one or more second candidate data sources to determine whether the second intermediate results are grounded; responsive to the second intermediate results being grounded, conducting a third search of the graph associated with the one or more second candidate data sources to obtain third intermediate results associated with the second intermediate results to generate a response to the query; and sending the response to the query source over the network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3A is a diagram showing an example of a multi-domain search for content in response to a query according to the disclosure.

FIG. 5B is a flow chart of another example process for performing a multi-domain query according to the techniques disclosed herein.

FIG. 8 is a diagram showing example query syntax according to the disclosure.

DETAILED DESCRIPTION

Systems and methods for performing multi-domain queries that combine explicit graph walks and fuzzy semantic reasoning of language models are provided. These techniques provide a technical solution to the technical problem associated with formulating queries that integrate semantic reasoning for obtaining data from graph-based data sources. Graphs walks can be used to retrieve data from these data sources, but the effectiveness of these queries is often dependent upon the ability of the query author to identify relevant patterns in the data and to formulate queries that effectively and efficiently identify such patterns in the data. The rigidity of the graph data structure can make it difficult to formulate queries that require semantic reasoning to over the data to generate requested content. The techniques herein provide a technical solution to this technical problem by leveraging the fuzzy semantic reasoning capabilities of a language model during query execution to generate query results that are based on inferences that are not expressly defined in the graph. These techniques utilize grounding and prompt construction techniques to ensure that the language model generates an output that is consistent with a global schema that represents the types of data available from the graph data sources. A technical advantage of this approach is that the semantic abilities of the language model can be leveraged to facilitate multi-domain queries while significantly reducing the risk that the language model will hallucinate and generate erroneous results. These and other technical benefits of the techniques disclosed herein will be evident from the discussion of the example implementations that follow.

Figure 1:
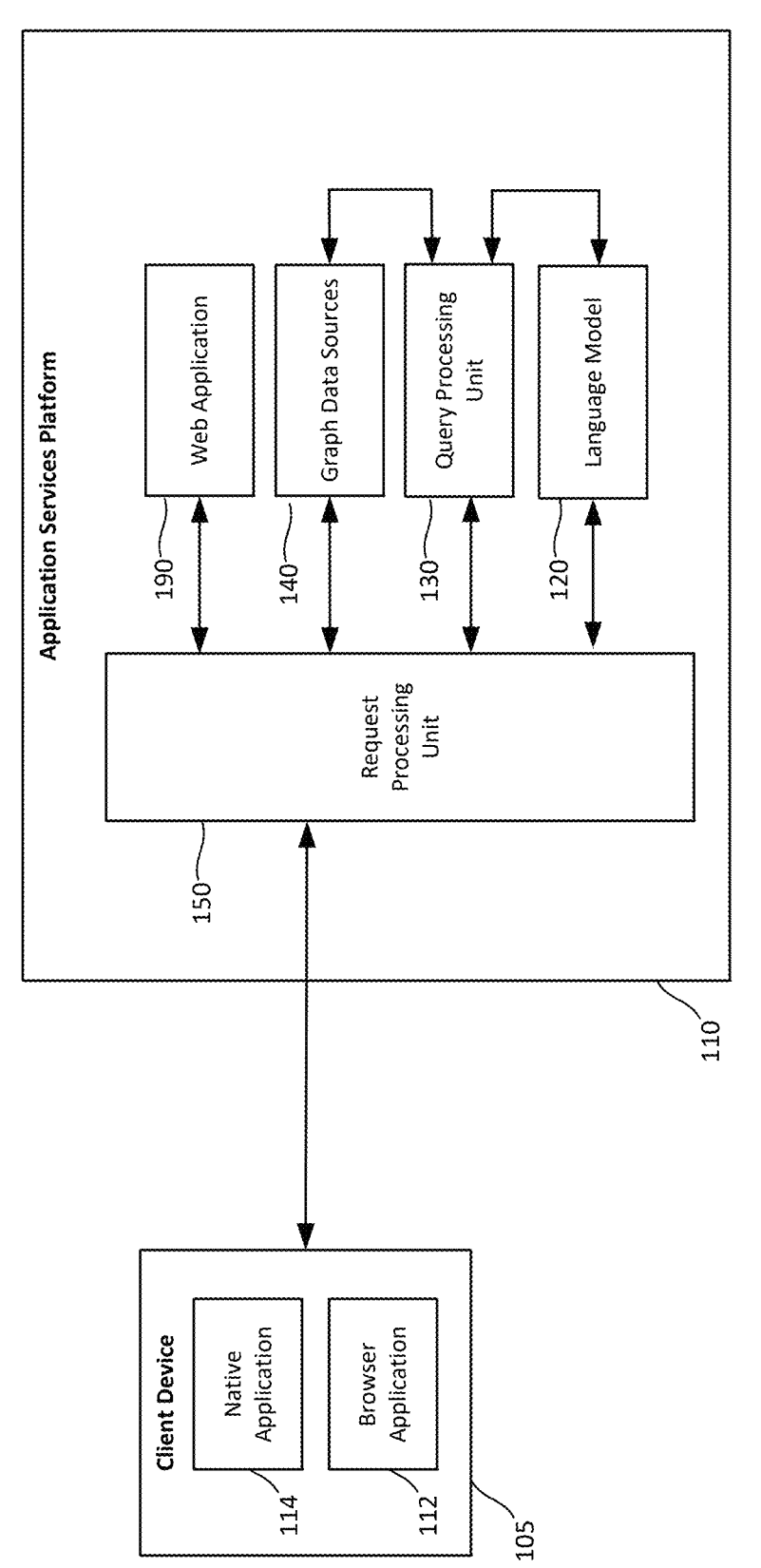
FIG. 1 is a diagram of an example computing environment in which the techniques for searching for content described herein are implemented.

FIG. 1 is a diagram of an example computing environment 100 in which the techniques for implementing multi-domain queries described herein are implemented. The example computing environment 100 includes a client device 105 and an application services platform 110. The application services platform 110 provides one or more cloud-based applications and/or provides services to support one or more web-enabled native applications on the client device 105. These applications may include but are not limited to design applications, communications platforms, visualization tools, and collaboration tools, and other applications for consuming and/or creating electronic content. These applications can include functionality that enables the user to construct queries that are submitted to the application services platform 110 to generate information based on fact-based data extracted from a graph representation of one or more data sources and semantic analysis provided by a language model. Additional details of how these queries can be implemented by the application services platform 110 are provided in the examples which follow. The client device 105 and the application services platform 110 communicate with each other over a network (not shown). The network may be a combination of one or more public and/or private networks and may be implemented at least in part by the Internet.

The request processing unit 150 receives requests from an application implemented by the native application 114 of the client device 105 and/or the web application 190 of the application services platform 110. The request processing unit 150 can also receive requests from other applications and/or services on the client device 105 and/or the application services platform 110. These requests can be requests to perform various types of actions, including requests for data from one or more data sources. The requests for data can be provided in the form of a prompt or a query that instructs the system to provide specific data. The request processing unit 150 also coordinates communication and exchange of data among components of the application services platform 110 as discussed in the examples which follow.

The query processing unit 130 analyzes and executes queries from the native application 114, the web application 190, and/or other applications or services implemented on the client device 105 and/or the application services platform 110. The query processing unit 130 is capable of conducting multi-domain searches in response to queries that include: (1) collecting factual data by performing one or more explicit graph walks on one or more graph data sources 140 exposed as a graph data structure, and (2) leveraging the fuzzy semantic reasoning abilities of a language model 120 to draw logical inferences from the factual data obtained from the graph walk. The queries can be expressed as natural language prompts in some implementations that would be difficult or impossible to express in a structured query language. For instance, the user might input a query: "Given my recent communications, what are the files that I need to follow up on?". Such a query requires inferences that would be difficult or impossible to implement in a standard query language that relies on fact-based traversals of data in the graph domain. Graph walks provide a means for collecting fact-based data from the graph data sources 140, but constructing queries to extract semantic meaning from the graph data depends upon the query author's ability to formulate a query to identify patterns in the data. The query processing unit 130 leverages the fuzzy semantic reasoning abilities of the language model 120 to generate inferences from the data collected from the graph walks. The query processing unit 130 limits the amount of semantic reasoning by the language model 120 to ensure that the output from the language model 120 is grounded based on the fact-based graph data and by expressly declaring the type of output expected to be generated by the language model 120. A technical advantage of this approach is that it reduces the likelihood that the language model 120 may hallucinate and generate an output that does not reflect the reality of the graph data structure. The query processing unit 130 ensures that any content generated by the language model 120 is grounded in the reality of the physical graph domain.

The query processing unit 130 can utilize this multi-domain query capability to implement Chain of Thought (CoT) reasoning. CoT reasoning is a problem solving mechanism in which complex tasks are broken down into a sequence of logical steps. The query processing unit 130 can perform multiple iterations of graph walks and fuzzy semantic reasoning to generate the information requested in a query. The query processing unit 130 builds upon intermediate information generated in each iteration to construct a response to the query. An example of such CoT reasoning is provided in FIG. 3B, which is discussed in detail below.

The graph data sources 140 include one or more data sources that are exposed as a graph using a graph schema. The one or more data sources can include various types of data that may be collected from various applications on the client device 105 and/or the application services platform 110. In a non-limiting example, the application services platform 110 provides services for users associated with an enterprise, and the data sources include user information, file information, email and/or other message data, and/or other collections of data associated with various aspects of the enterprise and the operation thereof. The information in each data source is exposed as a graph using an adapter that provides an interface for accessing and querying the underlying data in the data source.

The underlying data in each data source may be organized in various manners. For instance, the data may be organized in a graph database but is not limited to such a configuration. Each of the data sources of the graph data sources 140 may have different underlying data structures which are exposed as a graph that enables the query processing unit 130 and/or other components of the application services platform 110 to access and query the data sourced in the various data sources. The structure of the graph comprises nodes that represent various types of entities, while the edges between the nodes represent relationships between these data objects. Each of the entities represented by the nodes is associated with an object type defined in the graph schema, while the edges are associated with a relationship type that is defined in the graph schema. In a non-limiting example to illustrate these concepts, the graph data sources 140 can include a "Files" datastore in which files are represented as nodes in the graph and the edges of the graph show relationships between the files, such as files that are related and/or between files and users that have authored, modified, viewed, and/or perform other actions on the files. The graph data structure representation of the data in the data sources enables query processing unit 130 to perform graph walks on the data in the data sources to obtain factual information that can be provided as an input to the language model 120 to perform fuzzy semantic reasoning on the data that is impractical, if not impossible, to implement by fact-based queries on the graphs alone. Additional details of how the graph data sources 140 are utilized are provided in the examples which follow.

The language model 120 can be implemented by various types of artificial intelligence language models capable of receiving a natural language prompt as an input and generating new content based on the natural language prompt. The language model 120 can be implemented by a Large Language Model (LLM). In some implementations, the language model 120 is implemented using a Generative Pre-Trained Transformer (GPT) language model. Other types of language models capable of performing fuzzy semantic reasoning and generating a textual output in response to a textual prompt can be utilized in other implementations. Additional details of how the query processing unit 130 utilizes the language model 120 to perform semantic analysis on data obtained from the graph data sources 140 is provided in the examples which follow.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes a single client device, other implementations may include a different number of client devices that utilize service provided by the application services platform 110.

The client device 105 includes a native application 114 and a browser application 112. The native application 114 is a web-enabled native application, in some implementations, that enables users to view, create, and/or modify electronic content. The web-enabled native application utilizes services provided by the application services platform 110 including but not limited to creating, viewing, and/or modifying various types of electronic content. In other implementations, the browser application 112 is used for accessing and viewing web-based content provided by the application services platform 110. In such implementations, the application services platform 110 implements one or more web applications, such as the web application 190, that enables users to view, create, and/or modify electronic content and to obtain template recommendations for creating and/or modifying the electronic content. The native application 114 and/or the web application 190 can provide a user interface that enables users to input natural language queries that are submitted to the application services platform 110 to generate information based on fact-based data extracted from a graph representation of one or more data sources and semantic analysis provided by a language model. The user interface may also input structured query language queries in addition to or instead of the natural language queries. The application services platform 110 supports both web-enabled native applications and a web application in some implementations, and the users may choose which approach best suits their needs.

Figure 2:
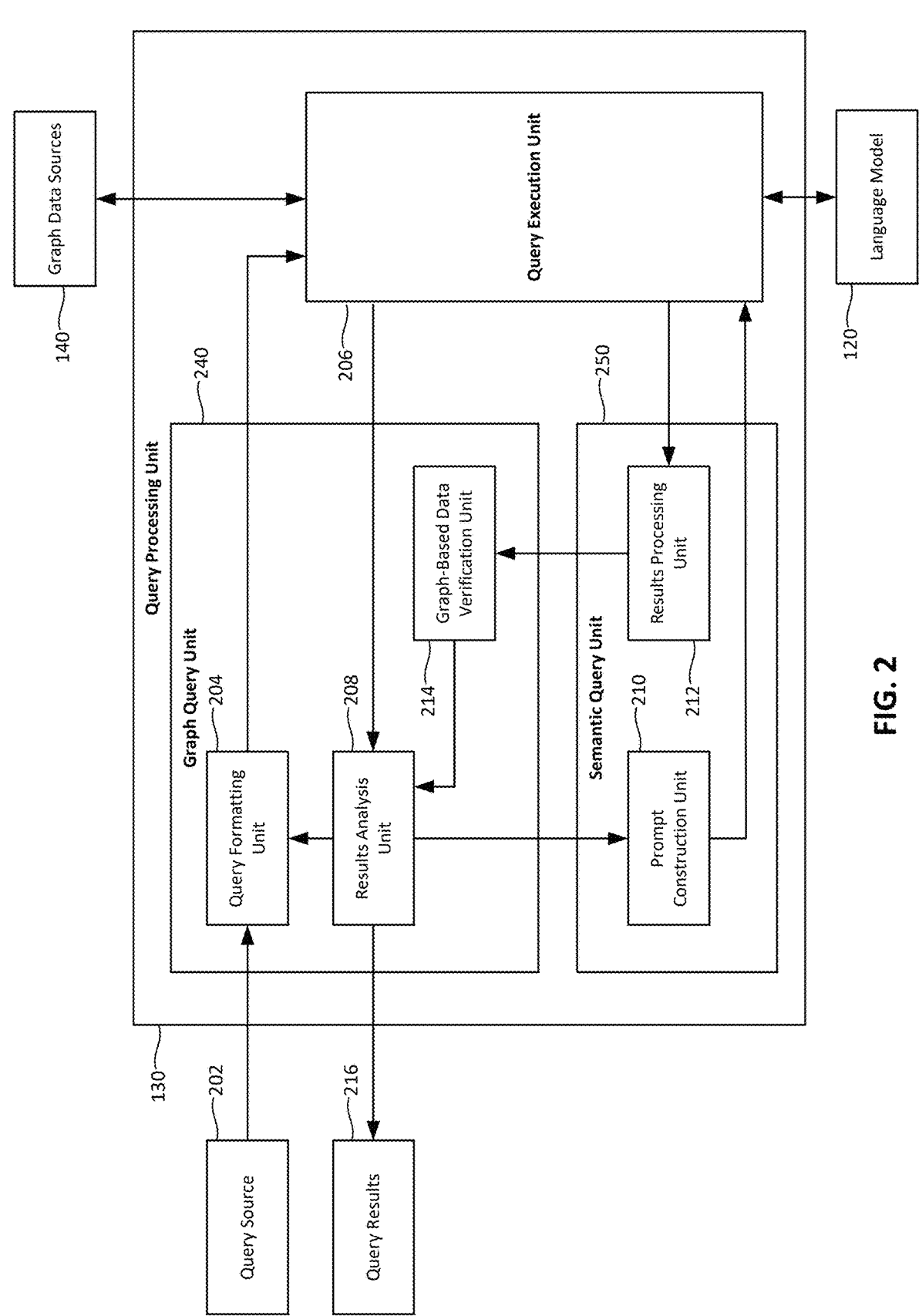
FIG. 2 is a diagram showing an example implementation of the query processing unit shown in FIG. 1.

FIG. 2 is a diagram showing an example implementation of the query processing unit shown in FIG. 1. The query processing unit 130 can receive a query from a query source 202. The query source 202 can be the native application 114 on the client device 105, the web application 190 on the application services platform 110, and/or other applications or services implemented on the client device 105 and/or the application services platform 110. Other implementations can include other applications or services implemented on the client device 105 and/or the application services platform 110 that serve as the query source 202.

The query can comprise a natural language prompt element that expresses the semantic reasoning that should be performed by the language model 120, the data from the graph data sources 140 to be provided as an input, and the data type of the content to be returned. An example of such a query is shown in FIG. 8. In this example, the query is expressed in the Cypher query language, but the techniques herein are not limited to a specific structured query language. The user provides a natural language prompt expressing the semantic reasoning to be performed. This natural language prompt may be combined with a prompt template that informs the language model 120 of the reasoning that should be performed. The input columns identify the data from the graph data sources 140 that is provided as an input to the query and output columns indicate that the type of output expected. In this example, the user prompt is "Given my recent communications, what are the files that I need to follow up on?" and the expected type of output is the filenames of the files that the user needs to follow up on. The semantic reasoning to be performed by the language model 120 is referred to as a "concept" in this example, and the concept is the files that the user needs to follow up on based on the user's recent communications. A technical advantage of this approach is that the simple syntax of the query is able to leverage the powerful fuzzy semantic reasoning capabilities of the language model 120. The input and output of the language model 120 is fully managed by the query processing unit 130. In other implementations, the natural language prompt is input by the user and the query syntax is automatically generated for the user based on the natural language prompt.

Figure 4A:
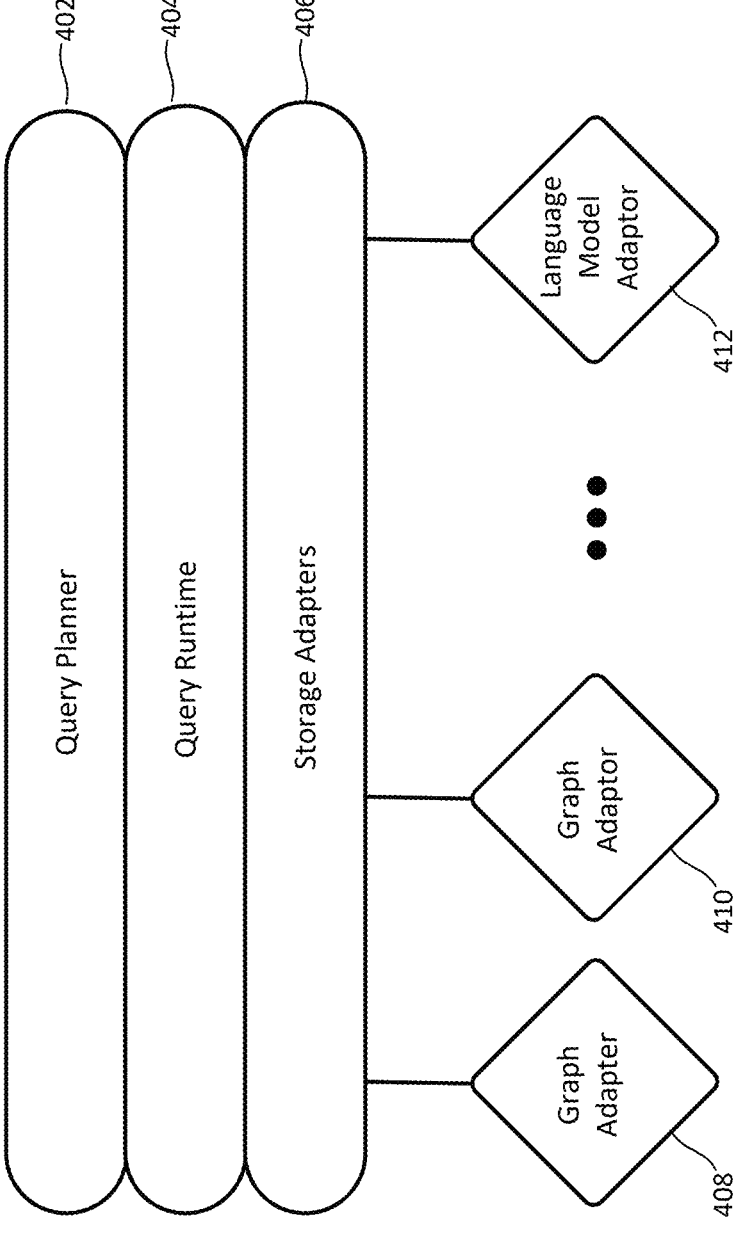
FIG. 4A is a diagram showing an example implementation of the query execution unit that includes adapters for accessing data and/or capabilities of the graph data sources and the capabilities of the language model.

The graph query unit 240 receives the query from the query source 202 and can format the query into a format expected by the query execution unit 206. In instances in which the query is formulated in a structured query language, the graph query unit 240 can check the syntax of the query to ensure that the syntax is correct before submitting the query to the query execution unit 206 for execution. In instances in which the query is formulated as a natural language prompt without the associated query syntax, the graph query unit 240 can construct the query based on the natural language prompt. To construct the query, the graph query unit 240 can construct a prompt to the language model 120 instructing the language model 120 to identify any data types that are referenced in the natural language prompt that are also found in the graph schema as the inputs and/or outputs of the query. The natural language prompt input by the user is used to as the basis for the semantic reasoning to be performed on the input to the query and to generate the requested outputs. The constructed query can then be provided to the query execution unit 206 for execution. FIG. 4A, described in detail in the examples which follow, provides an example implementation of the query execution unit 206. The query execution unit analyzes the query and executes the query on the graph data sources 140 initially to obtain the input data from the graph that will be analyzed by the language model 120. The results of querying the graph are provided to the results analysis unit 208 as intermediate results of the query, which may be further analyzed and/or combined with other intermediate results to generate the query results 216.

The results analysis unit 208 determines whether the query requires semantic reasoning on the intermediate results of the graph query provided by the query execution unit 206. The results analysis unit 208 makes this determination based on the query language and the intermediate results returned from the graph query. Responsive to determining that the query requires semantic reasoning by the language model 120, the results analysis unit 208 provides the query and the intermediate results received from the query execution unit 206 to the semantic query unit 250 for analysis. The prompt construction unit 210 of the semantic query unit constructs a prompt instructing the language model 120 to perform specific semantic reasoning on the intermediate results obtained from the graph query unit 240. The prompt construction unit 210 provides the prompt to the query execution unit 206 for execution to obtain additional intermediate results of the query. The query execution unit 206 provides additional intermediate results of the query to the semantic query unit 250 for analysis. The results processing unit 212 of the semantic query unit 250 provides the additional intermediate results generated by the language model 120 to the graph-based data verification unit 214 to determine whether the additional intermediate results are grounded by the schema. The graph-based data verification unit 214 compares the results generated by the language model 120 are consistent with the schema that represents the data included in the graph data sources 140. The graph-based data verification unit 214 can discard the additional intermediate results generated by the language model 120 and/or perform other actions in response to determining that the additional intermediate results generated by the language model 120 are not consistent with the graph data and therefore may be the result of a hallucination by the language model 120. The graph-based data verification unit 214 provides the information generated by the language model 120 to the results analysis unit 208. The results analysis unit 208 determines whether additional graph walks and/or semantic reasoning phases are required to generate the query results 216. As will be discussed in greater detail in the example implementations which follow, the query processing unit 130 can perform multiple iterations of searching and reasoning which are chained together to generate the query results 216.

The results analysis unit 208 provides the intermediate results obtained thus far to the query formatting unit 204 of the graph query unit 240 if an additional graph walk is required to collect additional data from the graph representations of the graph data sources 140. The results analysis unit 208 provides the intermediate results obtained thus far to the prompt construction unit 210 of the semantic query unit 250 responsive to additional semantic analysis of the intermediate results being required to generate the query results 216. Once the query results 216 have been generated, the query results 216 can be provided to the query source 202 from which the query originated. The query source 202 may present the query results 216 on a user interface of the client device 105 and/or perform additional analysis on the query results 216.

Figure 3A:
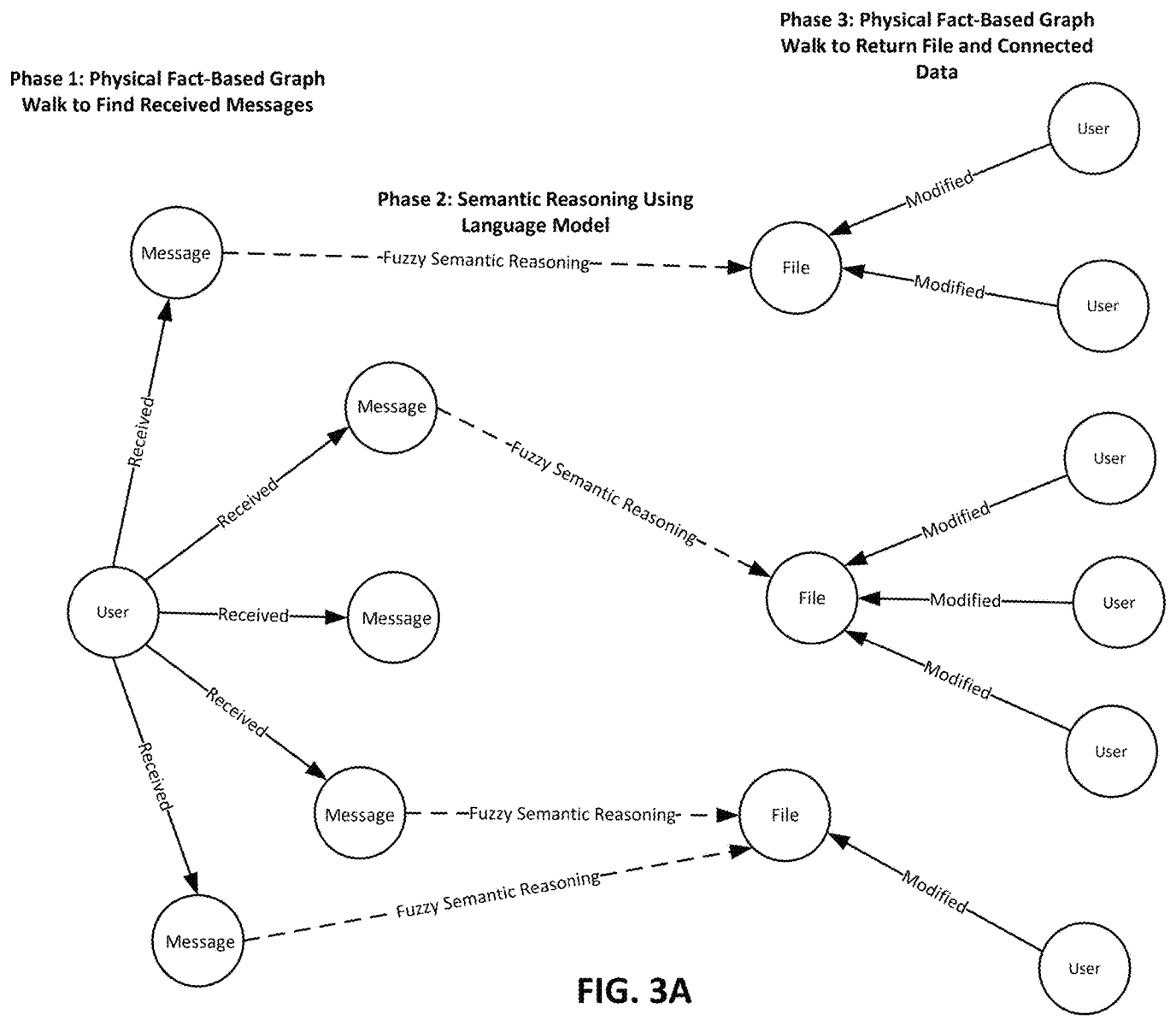

FIG. 3A is a diagram showing an example of a multi-domain search for content in response to a query according to the disclosure. In the example shown in FIG. 3A, the user inputs a prompt "Given my recent communications, what are the files that I need to follow up on?" into a user interface of the native application 114 or the web application 190. Generating a response to this query is not a straightforward process utilizing graph data alone. The user may have discussed files in emails, text messages, during video meetings, during collaboration sessions on a collaboration platform, and/or other communication platform. These conversations may reference specific files but often in an informal manner. The specific filename, location of the file, and/or other information that is relevant to identifying a specific file referenced in a communication may not be expressly mentioned in these communications. Consequently, it would be difficult to identify the appropriate files using graph walks alone. However, the semantic reasoning capabilities of the language model 120 can be utilized to analyze the data obtained from graph walk to identify the files mentioned in these communications.

In the example shown in FIG. 3A, the query processing unit 130 performs a multi-domain search that utilizes the both graph walks and semantic reasoning to generate a response to a user prompt "Given my recent communications, what are the files that I need to follow up on?". In a first phase of the search, the graph query unit 240 of the query processing unit 130 conducts a graph walk to identify messages that the user received. These messages may be email messages, text messages, and/or other types of messages received on various platforms of the application services platform 110. The message data is stored in the graph data sources 140 which are exposed with a graph interface that facilitates searching the data. In the first phase of the search, the graph query unit 240 has identified a user node and message nodes associated with the messages received by the user. While this example is limited to messages received by the user, the graph query unit 240 may also identify messages that have been sent by the user.

In the second phase of the search, the semantic query unit 250 of the query processing unit 130 receives the user node and message node information identified by the graph query unit 240 as input. The semantic query unit 250 also receives the user prompt as an input from the graph query unit 240. The semantic query unit 250 constructs a prompt to the language model 120 instructing the language model 120 to apply semantic reasoning to the factual information obtained from the graph. In this phase, the language model 120 applies fuzzy semantic logic in an attempt to identify files that are referenced in the messages that were received by the user. The prompt to the language model 120 includes schema information that identifies the object types for the resources that the language model 120 should output. In the non-limiting example shown in FIG. 3A, the prompt instructs the language model 120 to output file object types that identify the files that were referenced in the user's communications. A technical benefit of this approach is that the output from the language model 120 should match an object type referenced in the schema, which should also map to an object type that can be found in the graph representing the graph data sources 140. The enables the phase 3 of the search, in which the graph query unit 240 receives the output from the semantic query unit 250. In the third phase of the search, the semantic query unit 250 performs a fact-based graph walk to ensure that the results generated by the semantic query unit 250 have a factual basis in the graph data and are not merely a hallucination by the language model 120. The graph query unit 240 can collect additional information from the graph data sources 140 based on the output of the semantic query unit 250. In the example shown in FIG. 3A, the language model 120 outputs a response that predicts that the messages reference three files. The graph query unit 240 then compares the file information output by the semantic query unit 250. The file information represents the files that the language model 120 has reasoned are the files referenced in the messages received by the user. The graph query unit 240 compares the file information to the file information in the graph data sources 140 to ensure that the files references are for real files and not hallucinations. The graph query unit 240 can discard the file information for files that do not correspond to the graph data. The graph query unit 240 can then obtain additional information associated with the files that do correspond to files that exist in the graph data. In the example shown in FIG. 3A, the graph query unit 240 collects information from the graph data identifying users that have modified the three files. The graph query unit 240 then generates a response to the query that includes information identifying the file that the user may need to follow up on back on the user's communications and information indicating which other users have made updates to these files. FIG. 3A illustrates how the techniques disclosed herein can be applied to implement a search and does not limit the searches supported by these techniques to the specific types of data elements and/or the relationships between these data elements shown in this example.

Figure 3B:
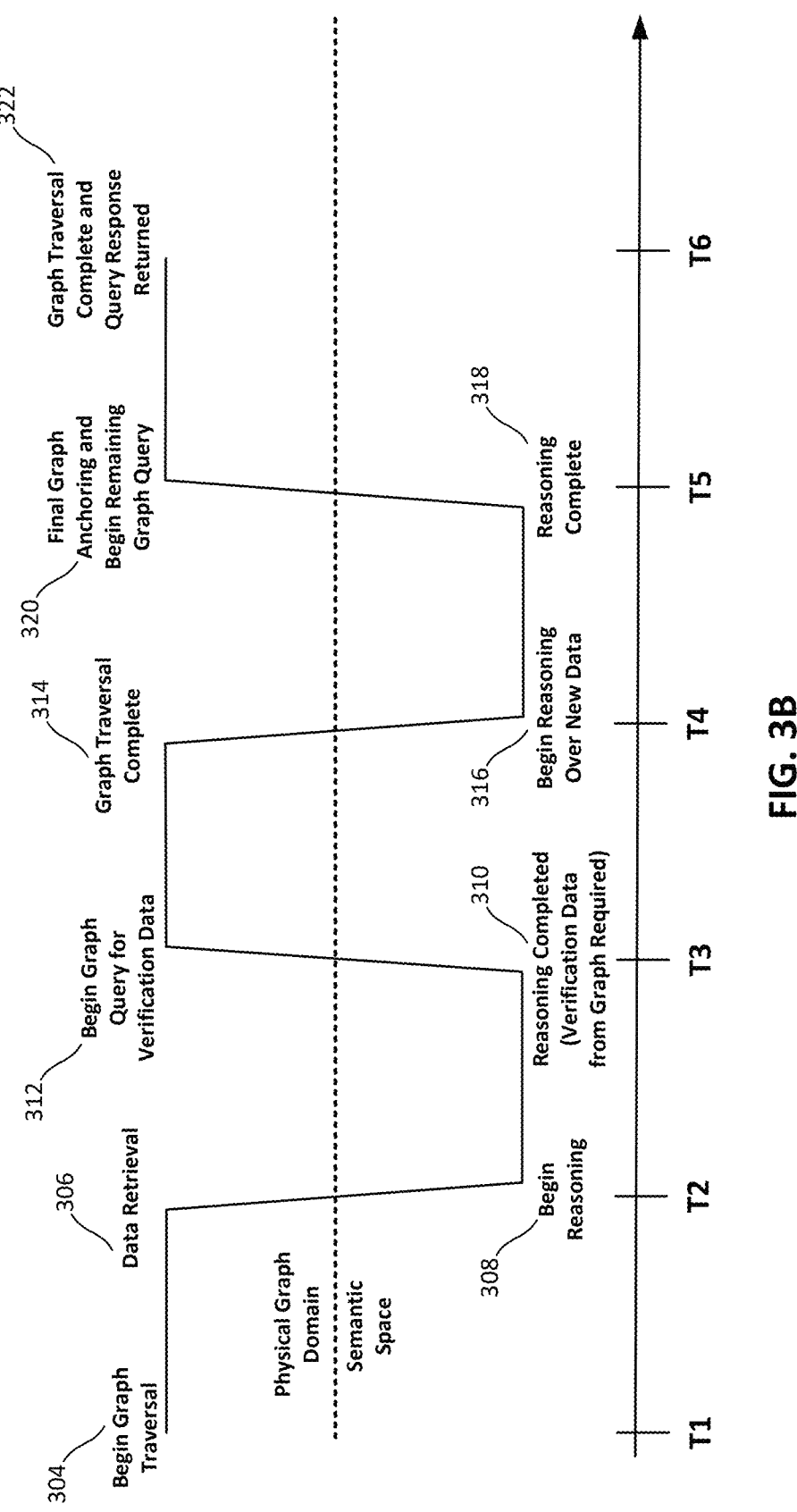
FIG. 3B is a diagram showing another example of a multi-domain search for content in response to a query according to the disclosure.

FIG. 3B is a diagram showing another example of a multi-domain search for content in response to a query according to the disclosure. In the example shown in FIG. 3B, multiple iterations of searching and reasoning are chained together to generate the search results. In operation 304, the graph query unit 240 of the query processing unit 130 performs a graph traversal to identify data relevant to the user prompt. The graph query unit 240 may utilize the fuzzy semantic reasoning capabilities of the language model 120 to determine which data entities are relevant to the search. The graph query unit 240 can provide the user prompt and the schema to identify object types from the schema that may be represented by nodes in the graph. In other implementations, the query source 202 may specify one or more data types to be searched. The query source 202 can be implemented by the native application 114 and/or the web application 190 in such implementations, and the query source 202 can indicate one or more data types from the schema that are relevant to the user prompt. A technical advantage of these two approaches is that the user does not need to be aware of the data types included in the schema or be skilled in crafting queries in a structured query language. The user can simply input a natural language prompt that indicates the content for which the user would like to conduct a search. In yet other implementations, the user inputs the query in a structured query language, such as but not limited to Cypher Query Language, that identifies the content for which the user would like to search. This latter approach can be utilized in implementations in which the user has access to the schema and understands how to construct a query that utilizes the object types defined in the schema using a structured query language. In operation 306, the graph query unit retrieves data associated with the nodes and/or edges of the graph identified in operation 304. The nodes and/or edges can be associated with attribute information. For example, referring back to the example shown in FIG. 3A, the nodes associated with messages can be associated with attribute information, such as but not limited to an indication of the message sender, when the message was received, the platform on which the message was received, whether the message included any attached, and/or other such information. The information collected by the graph query unit 240 from the physical graph domain is then provided to the semantic query unit 250 which analyzes this information in the semantic space using the language model 120.

In operation 308, the semantic query unit 250 constructs a first prompt to the language model 120 instructing the language model 120 to analyze the information obtained from the physical graph domain. The semantic query unit 250 constructs the first prompt using a prompt template (also referred to herein as a pre-prompt) that includes instructions that guide the language model 120 in generating an appropriate output in response to the prompt. The prompt template is appended to any natural language prompt that was input by the user. The prompt template can instruct the language model 120 to generate an output having a specific format, such as but not limited to JavaScript Object Notation (JSON), Extensible Markup Language (XML), and/or other formats that can be processed by the graph query unit 240 and/or semantic query unit 250 of the query processing unit 130. The prompt template can also include additional attributes of the output to be generated by the language model 120, such as the character set to be used, any required fields, and/or other attributes of the response. The prompt template is engineered to be succinct as possible to avoid token limits that may be imposed by the language model 120. The schema or a subset thereof may also be included in the prompt constructed by the semantic query unit 250 to provide context to the language model 120 when analyzing the information provided by the graph query unit 240. In operation 308, the semantic query unit 250 provides the constructed first prompt as an input to the language model 120 to being the reasoning, and in operation 310, the semantic query unit 250 obtains the information output by the language model 120. The semantic query unit 250 provides the information generated by the model to the graph query unit 240. In operation 312, the graph query unit 240 verifies that the information generated by the language model 120 is grounded by the schema and is not a result of a hallucination by the language model 120. The semantic query unit 250 includes the expected object type or object types of the output from the model in the prompt to guide the language model 120 in generating information that is consistent with the schema. The graph query unit 240 can discard the information generated by the language model 120 in instances in which the information generated by the model is not consistent with the schema. Alternatively, the graph query unit 240 can request that the graph query unit 240 resubmit the prompt and/or the graph query unit 240 can halt the search and report that no results were found to the client device 105.

In operation 314, the graph query unit 240 determines that the graph traversal is complete but additional semantic analysis by the language model 120 will be required to satisfy the user prompt. The graph query unit 240 provides the data obtained from the physical graph domain thus far to the semantic query unit 250, and in operation 316, the semantic query unit 250 constructs a second prompt to the language model 120 instructing the language model 120 to analyze the information obtained from the physical graph domain. The semantic query unit 250 can utilize the prompt template that was used to generate the first prompt in operation 308. In some implementations, the language model 120 maintains a session context which keeps track of prompts previously submitted to the language model 120. In such implementations, the language model 120 maintains during the session and the semantic query unit 250 does not need to resubmit the prompt template to the language model 120. In operation 318, the semantic query unit 250 obtains the information output by the language model 120 in response to the second prompt. In operation 320, the graph query unit 240 verifies that the information generated by the language model 120 is grounded by the schema and is not a result of a hallucination by the language model 120. The graph query unit 240 determines that the graph traversal is complete in operation 322 and provides the query response to the native application 114 and/or the web application 190.

FIG. 4A is a diagram showing an example implementation of the query execution unit 206 that includes adapters for accessing data and/or capabilities of the graph data sources 140 and the capabilities of the language model 120. The example implementation of the query execution unit 206 shown in FIG. 4A includes a query planner layer 402, a query runtime layer 404, and a storage adapters layer 406.

The storage adapters layer 406 provides an interface for accessing the graph data sources 140 via plug-in adapters. Each data source is associated with an adapter that implements an application programming interface (API) that exposes data in the data source as a graph. In the example shown in FIG. 4A, there are only two adaptors: adaptor 408 associated with a first graph data source and adaptor 410 associated with a second graph data source. The adapter indicates what data is exposed by the data source and which query capabilities are supported by the data source. The global schema defines the types of object types that can be represented by the nodes in the graphs of the data included in the data sources and the types of relationships between nodes that can be represented by the edges connecting nodes in the graph. Both nodes and edges can have a set of attributes associated with them. The schema can be used to validate data output by the language model 120 to ensure that the data is grounded and is not merely a hallucination by matching the data types and/or types of relationships referenced in the data generated by the language model 120.

The storage adapters layer 406 provides a technical solution to the problem of integrating the ability to access the capabilities of a language model, such as the language model 120, into queries. The language model 120 is associated with a language model adapter 412 that expose the capabilities of the language model 120. The language model adapter 412 does not expose any data apart from what the model generates while reasoning.

The query planner layer 402 converts the query to an executable format that can be executed by the query runtime layer 404. The query planner layer 402 automatically supports and leverages the breadth of available APIs provided via the adaptors to anchor conceptual/reasoned entities referenced in the information generated by the language model 120 with the physical graph without query author involvement. The query author does not need to be aware of the various data sources that are available or select specific data sources, as the query planner layer 402 will automatically select appropriate sources that can fulfill the query. The query planner layer 402 can minimize the number of data sources utilized and/or consider the latency associated with data sources when selecting from among the available data sources. In some implementations, the query planner layer 402 can utilize a language model, heuristics, and/or other types of machine learning models to select the best suited set of data sources/APIs.

The query planner layer 402 includes a lexical analyzer that tokenizes the query, and a parser that analyzes the tokens and converts the tokens to executable program code. The query planner layer 402 is also configured to select one or more candidate data sources to be queried. The query planner layer 402 analyzes the query and interrogates the schema associated with the graph data sources 140 to identify one or more candidate data sources that can be used to provide the data types required to satisfy a query. The query planner layer 402 can select the one or more candidate data sources based at least in part on the object type or object types to be returned by the query. The query planner layer 402 can exclude candidate data sources that do not provide the type of object types that are requested by the query. The query processing unit 130 can also select the first candidate data sources that minimize a total number of data sources included in the one or more first candidate data sources, that minimize a latency associated with retrieving data from the one or more first candidate data sources, or both. The data sources may include overlapping sets of data, and the query processing unit 130 can minimize the number of data sources from which the data is obtained to reduce the computational resources required to obtain the data. The query processing unit 130 can also select data sources that will introduce the least amount of latency when executing the user query.

The query planner layer 402 generates executable program code that is executed by the query runtime layer 404. The query runtime layer 404 executes this program code and performs a graph walk on the one or more candidate data sources selected by the query planner layer 402 by accessing the one or more candidate data sources via the respective adapter. The query runtime layer 404 can also implement the queries that integrate the fuzzy semantic reasoning of the language model 120 by accessing the capabilities of the model via the language model adapter 412. The language model adapter 412 can provide a prompt constructed by the prompt construction unit 210 of the semantic query unit 250 as an input to the query execution unit 206 and obtain the data generated by and output from the language model 120 in response to the prompt.

Figure 4B:
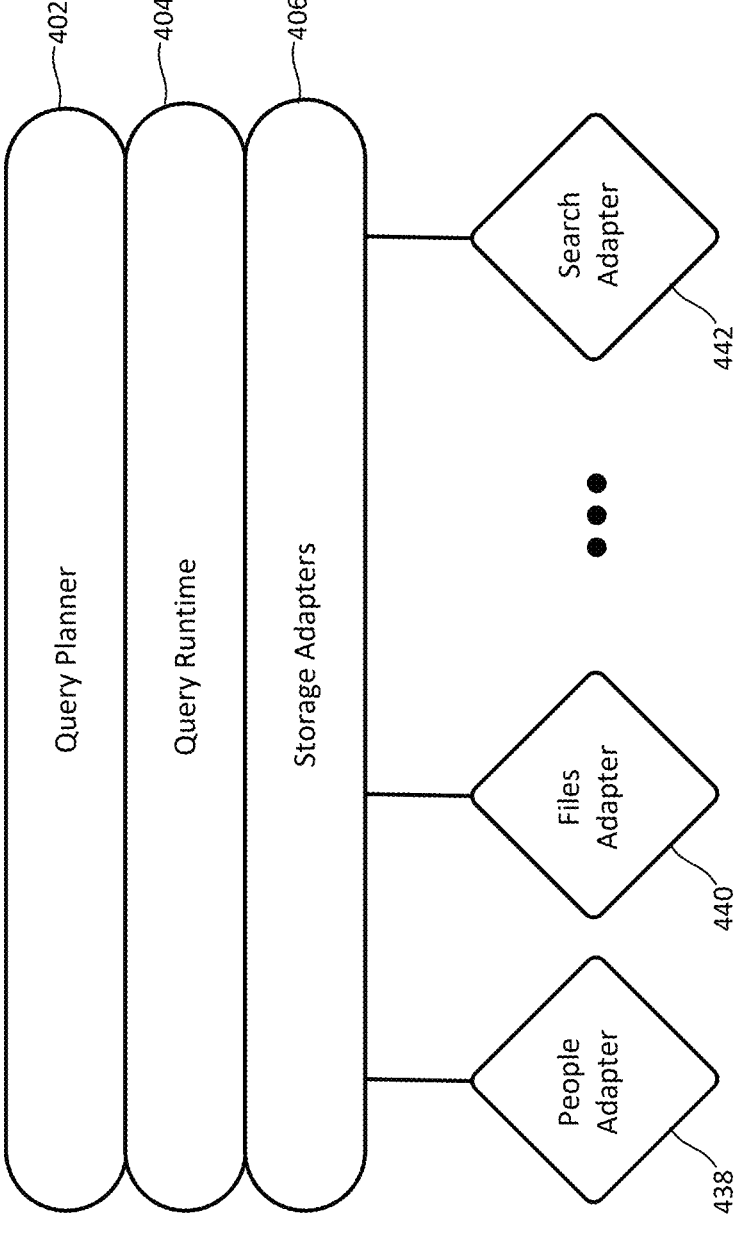
FIG. 4B is a diagram showing an example implementation of the query execution unit that includes adapters for accessing data and/or capabilities of the graph data sources and the capabilities of the language model.

FIG. 4B is a diagram showing another example implementation of the query execution unit 206 that includes adapters for accessing data and/or capabilities of the graph data sources and the capabilities of the language model 120. In the example implementation shown in FIG. 4B, the storage adapters layer 406 is associated with a different set of adaptors than those shown in FIG. 4A. In FIG. 4B, the storage adaptors layer is associated with a people data source adapter 438, a files data source adapter 440, and a search adapter 442. The people datastore adapter 438 exposes, as a graph, a data source that includes information for people associated with an enterprise. The people data store adaptor 438 can return person data type objects. The nodes of the graph include nodes of a person data type that includes attributes of a person within the enterprise, such as the person's name, role within the enterprise, office location, phone number, email address, and/or other information. The edges in the graph show relationships between people in the people data source. For example, the relationships may indicate supervisor-employee relationships, team member-team member relationships, and/or other types of relationships among the people represented in the people data source. The edges of the graph may also show the relationship between people and other types of entities associated with the enterprise, such as but not limited to files, various types of messages sent and/or received by the people, and/or other types of information.

The file data source adaptor 440 exposes, as a graph, a data source that includes information for files created, viewed, and/or modified by people within the enterprise. The nodes of the graph are a file data type that include attributes of a file, such as but not limited to a file name, file location, file permissions, file type, file creation date, file author, and/or other types of information that may be associated with a file. The edges of the graph may show relationships between files and other entities, such as users who have authored, accessed, modified, or otherwise interacted with the file.

The search adaptor 442 exposes the capabilities of a search language model that facilitates searches for people. The search language model can utilize the data exposed by the people datastore adapter 438 and/or the file data source adaptor 440 to utilize the fuzzy semantic reasoning capabilities of the model to facilitates searching for people within the enterprise. For example, the search adaptor 442 may receive a prompt from a user "Find other people outside of my department that have contributed to the files associated with Project X". The search can be conducted using a combination of graph walks and fuzzy semantic reasons, such as that shown in the preceding examples to implement the people search. This example us intended to illustrate a non-limiting example of how the adaptors can be used to facilitate multi-domain searches.

Figure 5A:
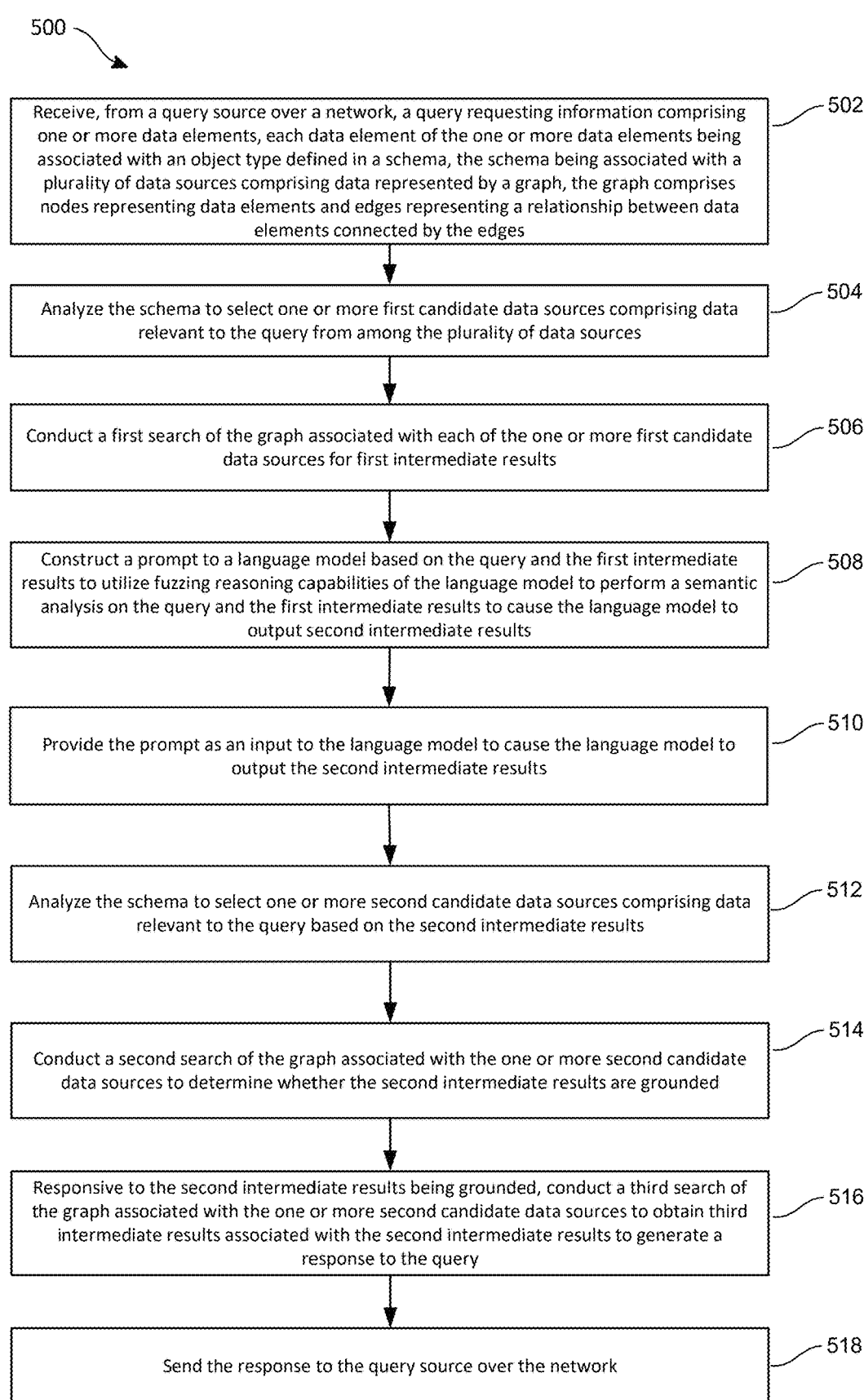
FIG. 5A is a flow chart of an example process for performing a multi-domain query according to the techniques disclosed herein.

FIG. 5A is a flow chart of an example process 500 for performing a multi-domain query according to the techniques disclosed herein. The process 500 can be implemented by the query processing unit 130 of the application services platform 110 as discussed in the preceding examples.

The process 500 includes an operation 502 of receiving, from a query source 202 over a network, a query requesting information comprising one or more data elements. Each data element of the one or more data elements is associated with an object type defined in a schema. The schema is associated with a plurality of graph data sources 140 that include data represented by a graph. The graph comprises nodes representing data elements and edges representing a relationship between data elements connected by the edges. The query source 202 can be the native application 114, the web application 190, and/or other applications and/or services implemented on the client device 105 and/or the application services platform.

The process 500 includes an operation 504 of analyzing the schema to select one or more first candidate data sources comprising data relevant to the query from among the plurality of graph data sources 140. The one or more first candidate data sources can be selected based at least in part on the object type of the one or more data elements. The query processing unit 130 can also select the first candidate data sources that minimize a total number of data sources included in the one or more first candidate data sources, that minimize a latency associated with retrieving data from the one or more first candidate data sources, or both. The data sources may include overlapping sets of data, and the query processing unit 130 can minimize the number of data sources from which the data is obtained to reduce the computational resources required to obtain the data. The query processing unit 130 can also select data sources that will introduce the least amount of latency when executing the user query.

The process 500 includes an operation 506 of conducting a first search of the graph associated with each of the one or more first candidate data sources for first intermediate results. The graph query unit 240 of the query processing unit 130 conducts the search of the graph to obtain first intermediate results. The first intermediate results include data associated with one or more nodes and/or edges of the graph representation of the data.

The process 500 includes an operation 508 of constructing a prompt to a language model based on the query and the first intermediate results to utilize fuzzy reasoning capabilities of the language model to perform a semantic analysis on the query and the first intermediate results to cause the language model to output second intermediate results and the first intermediate results to cause the language model to output second intermediate results an operation 510 of providing the prompt as an input to the language model 120 to cause the language model to output the second intermediate results. The semantic query unit 250 of the query processing unit 130 constructs a prompt to the language model 120 based on the query and the first intermediate results. The language model 120 performs a semantic analysis on the first intermediate results based on prompt and the query input by the user.

The process 500 includes an operation 512 of analyzing the schema to select one or more second candidate data sources comprising data relevant to the query based on the second intermediate results and an operation 514 of conducting a second search of the graph associated with the one or more second candidate data sources to determine whether the second intermediate results are grounded. The graph query unit 240 determines whether the information generated by the language model 120 is grounded by the schema and is not a result of a hallucination by the language model 120. The information generated by the language model 120 may reference one or more data elements. The graph query unit 240 determines whether these data elements are associated with a data type that is found in the schema. If a data element referenced in the information generated by the language model 120 are associated with a data type not found in the schema, then the information generated by the model is not grounded and is likely a hallucination.

The process 500 includes an operation 516 of responsive to the second intermediate results being grounded, conducting a third search of the graph associated with the one or more second candidate data sources to obtain third intermediate results associated with the second intermediate results to generate a response to the query. The graph query unit 240 can obtain additional information from the graph based on the second intermediate results generated by the language model 120. The additional information is selected from the graph based on the second intermediate results. This additional information can include information from one or more nodes and/or edges associated with the data types identified in the additional information. It is important to note that while the example process shown in FIG. 5A is not limited to three rounds of searching as shown in this example. Other searches may utilize a different number of rounds of graph-walking and inference stages to implement the search based on the requirements of that search.

The process 500 includes an operation 518 of sending the response to the query source over the network. The query processing unit 130 can send the response to the query to the query source 202. The query source 202 can be the native application 114 and/or the web application 190 in some implementations.

FIG. 5B is a flow chart of another example process 540 for performing a multi-domain query according to the techniques disclosed herein, can be implemented by the query processing unit 130 of the application services platform 110 as discussed in the preceding examples.

The process 540 includes an operation 542 of receiving, from a query source over a network, a natural language prompt requesting information from one or more data sources. The query source 202 can be the native application 114, the web application 190, and/or other applications and/or services implemented on the client device 105 and/or the application services platform. In such implementations, the natural language prompt describes content that the user has requested based on data from the graph data sources 140.

The process 540 includes an operation 544 of analyzing the natural language prompt to identify one or more data elements referenced in the natural language prompt. Each data element of the one or more data elements is associated with an object type defined in a schema. The schema is associated with a plurality of data sources comprising data represented by a graph. The graph comprises nodes representing data elements and edges representing a relationship between data elements connected by the edges. As discussed in the preceding examples, the query formatting unit 204 can utilize the language model 120 to analyze the textual prompt input by the user to identify the data elements referenced in the prompt. The query formatting unit 204 constructs a prompt instructing the language model 120 to analyze the prompt and the global schema to determine input data types and/or output data types for the content to be generated in response to the query.

The process 540 includes an operation 546 of constructing a query based on the natural language prompt and the one or more data elements referenced in the natural language prompt. The query formatting unit 204 constructs a query in a structured query language based on the input data types, the output data types, and/or the user prompt.

The process 540 includes an operation 548 of analyzing the schema to select one or more first candidate data sources comprising data relevant to the query from among the plurality of data sources. The one or more first candidate data sources can be selected based at least in part on the object type of the one or more data elements. The query processing unit 130 can also select the first candidate data sources that minimize a total number of data sources included in the one or more first candidate data sources, that minimize a latency associated with retrieving data from the one or more first candidate data sources, or both. The data sources may include overlapping sets of data, and the query processing unit 130 can minimize the number of data sources from which the data is obtained to reduce the computational resources required to obtain the data. The query processing unit 130 can also select data sources that will introduce the least amount of latency when executing the user query.

The process 540 includes an operation 550 of conducting a first search of the graph associated with each of the one or more first candidate data sources for first intermediate results. The graph query unit 240 of the query processing unit 130 conducts the search of the graph to obtain first intermediate results. The first intermediate results include data associated with one or more nodes and/or edges of the graph representation of the data.

The process 540 includes an operation 552 of constructing a prompt to a language model based on the query and the first intermediate results to utilize fuzzy reasoning capabilities of the language model to perform a semantic analysis on the query and the first intermediate results to cause the language model to output second intermediate results and an operation 554 of providing the prompt as an input to the language model to cause the language model to output the second intermediate results. The semantic query unit 250 of the query processing unit 130 constructs a prompt to the language model 120 based on the query and the first intermediate results. The language model 120 performs a semantic analysis on the first intermediate results based on prompt and the query input by the user.

The process 540 includes an operation 556 of analyzing the schema to select one or more second candidate data sources comprising data relevant to the query based on the second intermediate results and an operation 558 of conducting a second search of the graph associated with the one or more second candidate data sources to determine whether the second intermediate results are grounded. The graph query unit 240 determines whether the information generated by the language model 120 is grounded by the schema and is not a result of a hallucination by the language model 120. The information generated by the language model 120 may reference one or more data elements. The graph query unit 240 determines whether these data elements are associated with a data type that is found in the schema. If a data element referenced in the information generated by the language model 120 are associated with a data type not found in the schema, then the information generated by the model is not grounded and is likely a hallucination.

The process 540 includes an operation 560 of responsive to the second intermediate results being grounded, conducting a third search of the graph associated with the one or more second candidate data sources to obtain third intermediate results associated with the second intermediate results to generate a response to the query. The graph query unit 240 can obtain additional information from the graph based on the second intermediate results generated by the language model 120. The additional information is selected from the graph based on the second intermediate results. This additional information can include information from one or more nodes and/or edges associated with the data types identified in the additional information. It is important to note that while the example process shown in FIG. 5A is not limited to three rounds of searching as shown in this example. Other searches may utilize a different number of rounds of graph-walking and inference stages to implement the search based on the requirements of that search.

The process 540 includes an operation 562 of sending the response to the query source over the network. The query processing unit 130 can send the response to the query to the query source 202. The query source 202 can be the native application 114 and/or the web application 190 in some implementations.

The detailed examples of systems, devices, and techniques described in connection with FIGS. 1-5B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-5B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
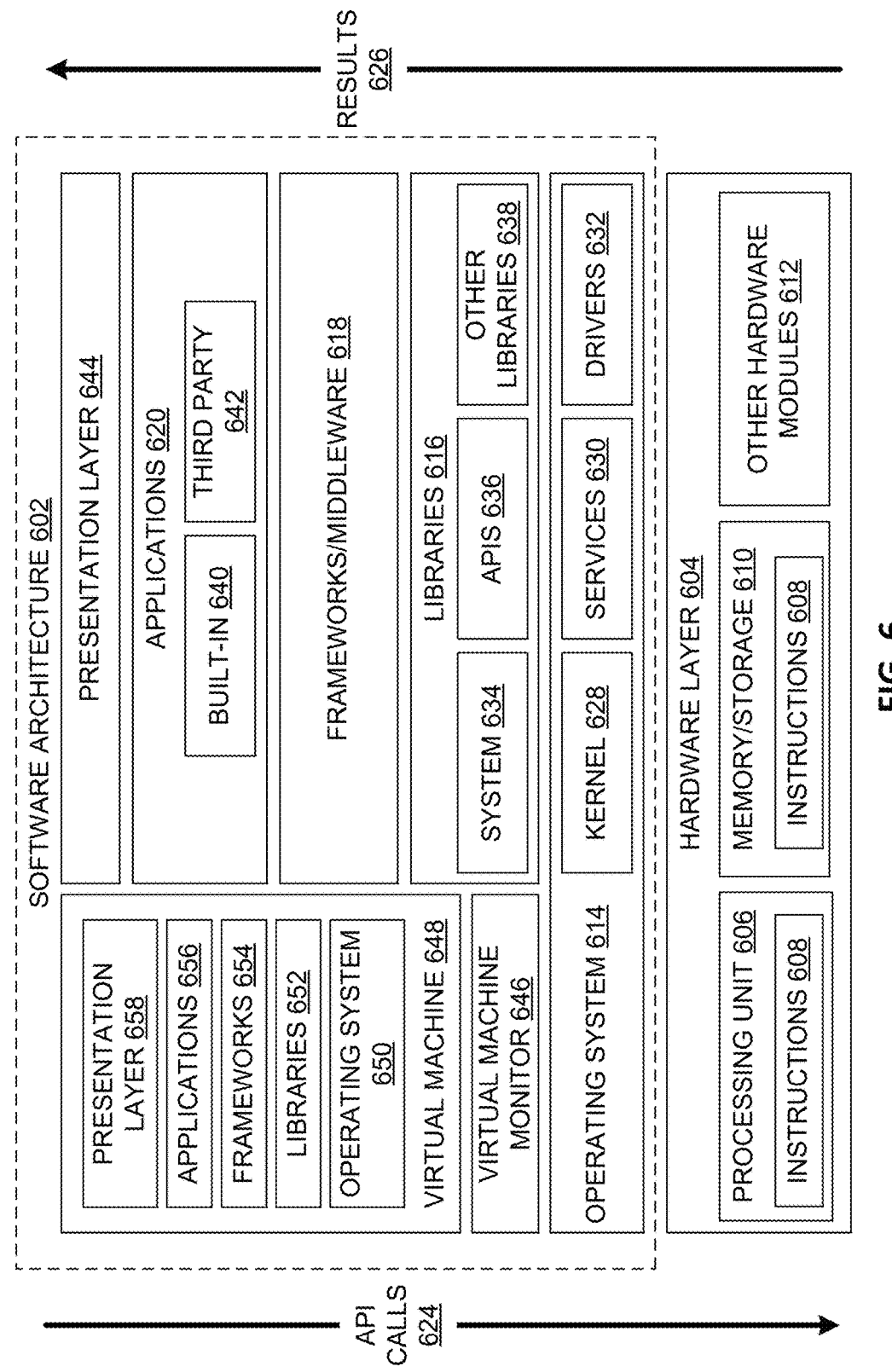
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory/storage, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks/middleware 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks/middleware 618 provide a higher-level common infrastructure that may be used by the applications 620 and/or other software modules. For example, the frameworks/middleware 618 may provide various graphic user interface (GUI) functions, high-level resource management, or high-level location services. The frameworks/middleware 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks/middleware 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
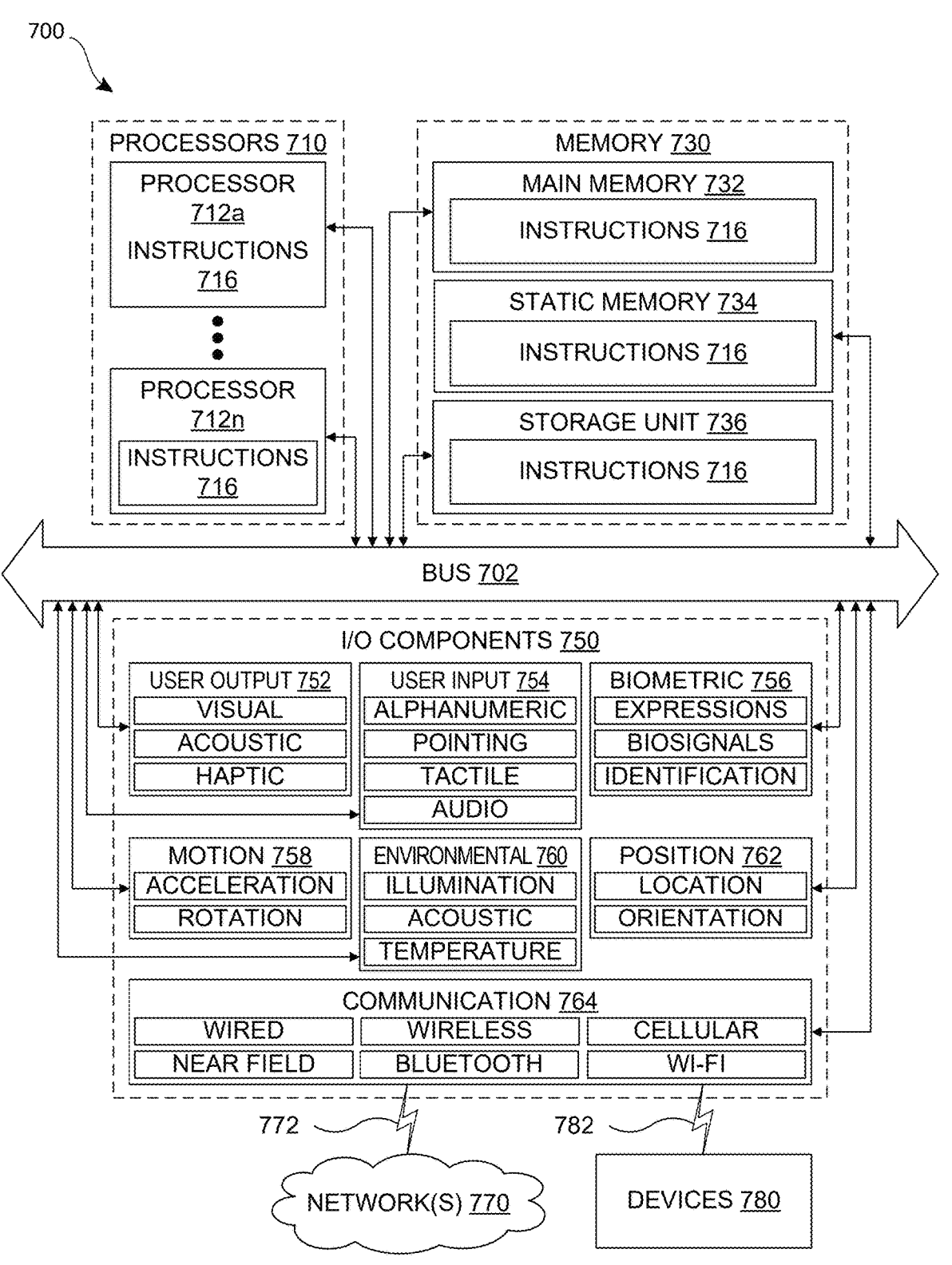
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IOT) device. Further, although only a single machine 700 is illustrated, the term "machine" includes a collection of machines that individually or jointly execute the instructions 716.

The machine 700 may include processors 710, memory/storage 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multicore processor including cores that may execute instructions contemporaneously. Although FIG. 7 shows multiple processors, the machine 700 may include a single processor with a single core, a single processor with multiple cores (for example, a multicore processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, randomaccess memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor; and a memory storing executable instructions that, when executed, cause the processor alone or in combination with other processors to perform operations of:

receiving, from a query source over a network, a query requesting information comprising one or more data elements, each data element of the one or more data elements being associated with an object type defined in a schema, the schema being associated with a plurality of data sources comprising data represented by a graph, the graph comprises nodes representing data elements and edges representing a relationship between data elements connected by the edges;

analyzing the schema to select one or more first candidate data sources comprising data relevant to the query from among the plurality of data sources;

conducting a first search of the graph associated with each of the one or more first candidate data sources for first intermediate results;

constructing a prompt to a language model based on the query and the first intermediate results to utilize fuzzy reasoning capabilities of the language model to perform a semantic analysis on the query and the first intermediate results to cause the language model to output second intermediate results;

providing the prompt as an input to the language model to cause the language model to output the second intermediate results;

analyzing the schema to select one or more second candidate data sources comprising data relevant to the query based on the second intermediate results;

conducting a second search of the graph associated with the one or more second candidate data sources to determine whether the second intermediate results are grounded by confirming that the second intermediate results are consistent with the schema and have a factual basis in data included in the graph;

responsive to the second intermediate results being grounded, conducting a third search of the graph associated with the one or more second candidate data sources to obtain third intermediate results associated with the second intermediate results to generate a response to the query; and sending the response to the query source over the network.

2. The data processing system of claim 1, wherein to analyze the schema to select the one or more first candidate data sources, the memory further includes instructions configured to cause the processor alone or in combination with other processors to perform operations of:

selecting the one or more first candidate data sources by minimizing a total number of data sources included in the one or more first candidate data sources, a latency associated with retrieving data from the one or more first candidate data sources, or both.

3. The data processing system of claim 1, wherein to conduct the second search of the graph associated with the one or more second candidate data sources to determine whether the second intermediate results are grounded, the memory further includes instructions configured to cause the processor alone or in combination with other processors to perform operations of:

comparing each data element referenced in the second intermediate results with data elements referenced in the schema to determine whether each data element has a corresponding data element in the schema; and determining that the second intermediate results are grounded in response to each of the data elements corresponding to a data element in the schema.

4. The data processing system of claim 1, wherein to construct the prompt to the language model, the memory further includes instructions configured to cause the processor alone or in combination with other processors to perform operations of:

constructing the prompt further comprises appending the query and the first intermediate results to a prompt template, the prompt template providing instructions to the language model for a format that the language model should output the second intermediate results.

5. The data processing system of claim 1, wherein to analyze the schema to select one or more second candidate data sources, the memory further includes instructions configured to cause the processor alone or in combination with other processors to perform operations of:

selecting the one or more second candidate data sources by minimizing a total number of data sources included in the one or more second candidate data sources, a latency associated with retrieving data from the one or more second candidate data sources, or both.

6. The data processing system of claim 1, wherein to conduct the third search of the graph associated with the one or more second candidate data sources to obtain data associated with the second intermediate results to generate the response to the query, the memory further includes instructions configured to cause the processor alone or in combination with other processors to perform operations of:

conducting a graph walk of the one or more second candidate data sources to identify the third intermediate results associated with the second intermediate results; and generating the response to the query based on one or more of the first intermediate results, the second intermediate results, or the third intermediate results.

7. The data processing system of claim 1, wherein the data processing system comprises a query execution unit, the query execution unit comprising:

a storage adapters layer, the storage adapters layer being associated with an adapter exposing each data source of the plurality of data sources as a graph;

a query planner layer analyzes the schema to identify one or more candidate data sources comprising data relevant to a respective query; and a query runtime layer that conducts a graph walk of the graph associated with the one or more candidate data sources to retrieve search results for the respective query.

8. A method implemented in a data processing system for providing content in response to a query, the method comprising:

receiving, from a query source over a network, the query requesting information comprising one or more data elements, each data element of the one or more data elements being associated with an object type defined in a schema, the schema being associated with a plurality of data sources comprising data represented by a graph, the graph comprises nodes representing data elements and edges representing a relationship between data elements connected by the edges;

analyzing the schema to select one or more first candidate data sources comprising data relevant to the query from among the plurality of data sources;

conducting a first search of the graph associated with each of the one or more first candidate data sources for first intermediate results;

constructing a prompt to a language model based on the query and the first intermediate results to utilize fuzzy reasoning capabilities of the language model to perform a semantic analysis on the query and the first intermediate results to cause the language model to output second intermediate results;

providing the prompt as an input to the language model to cause the language model to output the second intermediate results;

analyzing the schema to select one or more second candidate data sources comprising data relevant to the query based on the second intermediate results;

conducting a second search of the graph associated with the one or more second candidate data sources to determine whether the second intermediate results are grounded by confirming that the second intermediate results are consistent with the schema and have a factual basis in data included in the graph;

responsive to the second intermediate results being grounded, conducting a third search of the graph associated with the one or more second candidate data sources to obtain third intermediate results associated with the second intermediate results to generate a response to the query; and sending the response to the query source over the network.

9. The method of claim 8, wherein analyzing the schema to select the one or more first candidate data sources further comprises:

selecting the one or more first candidate data sources by minimizing a total number of data sources included in the one or more first candidate data sources, a latency associated with retrieving data from the one or more first candidate data sources, or both.

10. The method of claim 8, wherein conducting the second search of the graph associated with the one or more second candidate data sources to determine whether the second intermediate results are grounded further comprises:

comparing each data element referenced in the second intermediate results with data elements referenced in the schema to determine whether each data element has a corresponding data element in the schema; and determining that the second intermediate results are grounded in response to each of the data elements corresponding to a data element in the schema.

11. The method of claim 8, wherein constructing the prompt to the language model further comprises:

constructing the prompt further comprises appending the query and the first intermediate results to a prompt template, the prompt template providing instructions to the language model for a format that the language model should output the second intermediate results.

12. The method of claim 8, wherein analyzing the schema to select one or more second candidate data sources further comprises:

selecting the one or more second candidate data sources by minimizing a total number of data sources included in the one or more second candidate data sources, a latency associated with retrieving data from the one or more second candidate data sources, or both.

13. The method of claim 8, wherein conducting the third search of the graph associated with the one or more second

--- candidate data sources to obtain data associated with the second intermediate results to generate the response to the query further comprising:

conducting a graph walk of the one or more second candidate data sources to identify the third intermediate results associated with the second intermediate results; and generating the response to the query based on one or more of the first intermediate results, the second intermediate results, or the third intermediate results.

14. The method of claim 8, wherein the data processing system comprises a query execution unit, the method further comprising:

exposing each data source of the plurality of data sources as a graph with an adapter of a storage adapters layer of the query execution unit;

analyzing the schema using a query planner layer of the query execution unit to identify one or more candidate data sources comprising data relevant to a respective query; and conducting, using a query runtime layer of the query execution unit, a graph walk of the graph associated with the one or more candidate data sources to retrieve search results for the respective query.

15. A data processing system comprising:

a processor; and a memory storing executable instructions that, when executed, cause the processor alone or in combination with other processors to perform operations of:

receiving, from a query source over a network, a natural language prompt requesting information from one or more data sources;

analyzing the natural language prompt to identify one or more data elements referenced in the natural language prompt, each data element of the one or more data elements being associated with an object type defined in a schema, the schema being associated with a plurality of data sources comprising data represented by a graph, the graph comprises nodes representing data elements and edges representing a relationship between data elements connected by the edges;

constructing a query based on the natural language prompt and the one or more data elements referenced in the natural language prompt;

analyzing the schema to select one or more first candidate data sources comprising data relevant to the query from among the plurality of data sources;

conducting a first search of the graph associated with each of the one or more first candidate data sources for first intermediate results;

constructing a prompt to a language model based on the query and the first intermediate results to perform a semantic analysis on the query and the first intermediate results to cause the language model to output second intermediate results;

providing the prompt as an input to the language model to cause the language model to output the second intermediate results;

analyzing the schema to select one or more second candidate data sources comprising data relevant to the query based on the second intermediate results;

conducting a second search of the graph associated with the one or more second candidate data sources to determine whether the second intermediate results are grounded by confirming that the second intermediate results are consistent with the schema and have a factual basis in data included in the graph;

responsive to the second intermediate results being grounded, conducting a third search of the graph associated with the one or more second candidate data sources to obtain third intermediate results associated with the second intermediate results to generate a response to the query; and sending the response to the query source over the network.

16. The data processing system of claim 15, wherein to analyze the schema to select the one or more first candidate data sources, the memory further includes instructions configured to cause the processor alone or in combination with other processors to perform operations of:

selecting the one or more first candidate data sources by minimizing a total number of data sources included in the one or more first candidate data sources, a latency associated with retrieving data from the one or more first candidate data sources, or both.

17. The data processing system of claim 15, wherein to conduct the second search of the graph associated with the one or more second candidate data sources to determine whether the second intermediate results are grounded, the memory further includes instructions configured to cause the processor alone or in combination with other processors to perform operations of:

comparing each data element referenced in the second intermediate results with data elements referenced in the schema to determine whether each data element has a corresponding data element in the schema; and determining that the second intermediate results are grounded in response to each of the data elements corresponding to a data element in the schema.

18. The data processing system of claim 15, wherein to construct the prompt to the language model, the memory further includes instructions configured to cause the processor alone or in combination with other processors to perform operations of:

constructing the prompt further comprises appending the query and the first intermediate results to a prompt template, the prompt template providing instructions to the language model for a format that the language model should output the second intermediate results.

19. The data processing system of claim 15, wherein to analyze the schema to select one or more second candidate data sources, the memory further includes instructions configured to cause the processor alone or in combination with other processors to perform operations of:

selecting the one or more second candidate data sources by minimizing a total number of data sources included in the one or more second candidate data sources, a latency associated with retrieving data from the one or more second candidate data sources, or both.

20. The data processing system of claim 15, wherein to conduct the third search of the graph associated with the one or more second candidate data sources to obtain data associated with the second intermediate results to generate the response to the query, the memory further includes instructions configured to cause the processor alone or in combination with other processors to perform operations of:

conducting a graph walk of the one or more second candidate data sources to identify the third intermediate results associated with the second intermediate results; and generating the response to the query based on one or more of the first intermediate results, the second intermediate results, or the third intermediate results.

*    *    *    *    *